United States Patent [19]

Derrien et al.

[11] Patent Number: 5,429,323
[45] Date of Patent: Jul. 4, 1995

[54] RAISABLE UNDERCARRIAGE, IN PARTICULAR FOR A HEAVY TRANSPORT AIRCRAFT

[75] Inventors: Michel Derrien, Versailles; Philippe Brisedou, Fresnes, both of France

[73] Assignee: Messier-Bugatti, Velizy Villacoublay, France

[21] Appl. No.: 167,483

[22] Filed: Dec. 15, 1993

[30] Foreign Application Priority Data

Dec. 28, 1992 [FR] France .................. 92 15783

[51] Int. Cl.⁶ .................................... B64C 25/10
[52] U.S. Cl. .................................... 244/102 R
[58] Field of Search ....... 244/102 R, 102 SS, 104 FP, 244/103 R

[56] References Cited

U.S. PATENT DOCUMENTS

| | | | |
|---|---|---|---|
| 2,690,887 | 10/1954 | Perdue | 244/102 R |
| 2,754,072 | 7/1956 | Shapiro . | |
| 2,755,041 | 7/1956 | Lewis | 244/102 R |
| 2,967,682 | 1/1961 | Fullam et al. | 244/102 R |
| 3,511,456 | 5/1970 | Fehring et al. | 244/102 R |
| 4,345,727 | 8/1982 | Brown | 244/102 R |
| 5,086,995 | 2/1992 | Large | 244/102 R |
| 5,269,481 | 12/1993 | Derrien | 244/102 R |
| 5,299,761 | 4/1994 | Robin et al. | 244/102 R |

FOREIGN PATENT DOCUMENTS 0492685 11/1991 European Pat. Off. .
1232741 8/1959 France .

Primary Examiner—Galen L. Barefoot
Attorney, Agent, or Firm—Sixbey, Friedman, Leedom & Ferguson; Gerald J. Ferguson, Jr.

[57] ABSTRACT

The invention relates to a raisable undercarriage comprising a hinged leg and associated bracing means. According to the invention, the undercarriage is of the leg-shortening type, and the bracing means are organized in the form of a foldable brace having its bottom arm hinged to bottom end of the sliding rod of the hinged leg, said brace further being organized so that, in the undercarriage down position, the lowered leg slopes towards the front of the aircraft.

8 Claims, 1 Drawing Sheet

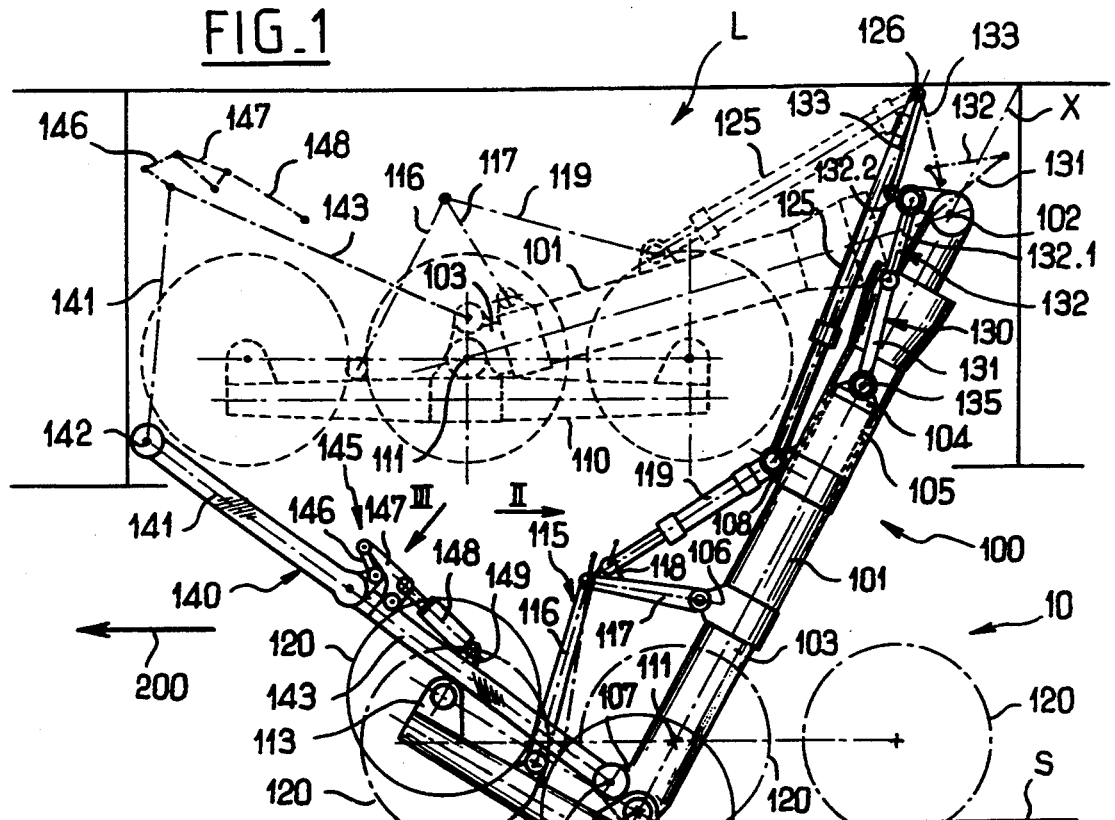
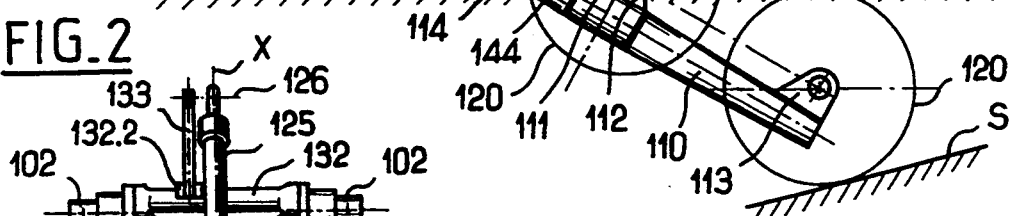
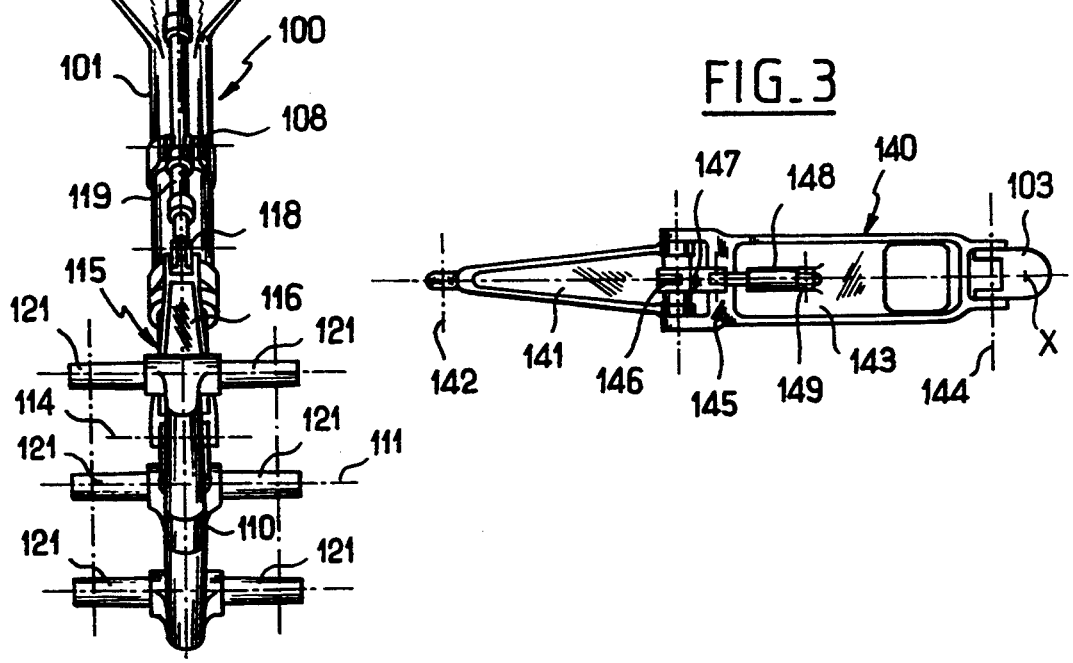

RAISABLE UNDERCARRIAGE, IN PARTICULAR FOR A HEAVY TRANSPORT AIRCRAFT

FIELD OF THE INVENTION

The invention relates to raisable undercarriages for heavy transport aircraft, such an undercarriage being of the type comprising a hinged leg and bracing means associated with the hinged leg, the hinged leg being composed of a shock-absorbing main strut having a hinge axis about which it is hinged to the structure of an aircraft, and of a shock-absorbing rod at the end of which a longitudinal beam is hinged that is equipped with a plurality of pairs of wheels.

BACKGROUND OF THE INVENTION

An undercarriage of this type includes at least four wheels, and in general includes six or eight wheels for a heavy transport aircraft, i.e. an aircraft weighing considerably more than 400 tons. The leg of such an undercarriage is naturally dimensioned accordingly, so that the recess for receiving the undercarriage when it is in the up position has to be long, and the structure of the aircraft must therefore be reinforced.

Reference may be made for example to Documents EP-A-0 492 685, EP-A-0 492 687, and EP-A-0 492 688.

Furthermore, the undercarriage leg and the associated bracing means are disposed such that considerable cutting forces are exerted on the shock-absorbing rod by the set of wheels when they bear against the ground, so that the leg has to be dimensioned accordingly to enable the sliding rod to slide normally under any circumstances.

Finally, the presence of a hinged longitudinal beam equipped with pairs of wheels (forming what may be referred to as a rocking bogie) makes it necessary to have a special linkage if, in the undercarriage up position, the beam is to be angularly positioned so as to be compatible with the desired compactness of the recess for receiving the undercarriage. To this end, in order to have a minimal recess height, it has been proposed to provide a linkage for turning the longitudinal beam over through 180° before retracting the main landing gear assembly in question.

The technological background of the invention is also illustrated by Documents EP-A-0 361 549, U.S. Pat. No. 2,754,072, and FR-A-1 232 741.

OBJECTS AND SUMMARY OF THE INVENTION

An object of the invention is to provide a raisable undercarriage that does not suffer from the above-mentioned drawbacks and/or limitations.

An object of the invention is therefore to provide a raisable undercarriage having a structure whereby the recess for receiving it when it is in the up position has a minimal volume, and the longitudinal and lateral forces produced when contact is made with the ground are taken up optimally both in the undercarriage and in the aircraft structure.

More particularly, the invention provides a raisable undercarriage comprising a hinged leg and bracing means associated with the hinged leg, the hinged leg being composed of a shock-absorbing main strut having a hinge about which it is hinged to the structure of an aircraft, and of a shock-absorbing rod at the end of which a longitudinal beam is hinged that is equipped with a plurality of pairs of wheels, wherein:

the undercarriage is of the leg-shortening type, having a shock absorber composed mainly of a sliding rod and a plunging rod, and also of a hinged system connecting the plunging rod to the shock-absorbing main strut, the hinged system being controlled by a link fixed to the aircraft structure so as to pull the shock absorber up when the leg is being raised, and so as to push the shock absorber down when the leg is being lowered; and the bracing means are organized in the form of a foldable brace having a top arm hinged to the aircraft structure and a bottom arm hinged to bottom end of the sliding rod, said brace further being organized so that, in the undercarriage down position, the lowered leg slopes towards the front of the aircraft.

Preferably, the hinge axis about which the shock-absorbing main strut is hinged to the aircraft structure is perpendicular to the longitudinal midplane of the aircraft, and the foldable brace is disposed in front of the leg so that the undercarriage is raised longitudinally and forwards.

It is also advantageous for the leg to include a torque linkage having a top arm hinged to the shock-absorbing main strut, and a bottom arm hinged to the longitudinal beam which is hinged at the end of the sliding rod.

Advantageously, a pitch damper is then interposed between the torque linkage and the shock-absorbing main strut, which pitch damper is hinged for example on a projection on the top arm of the torque linkage. Also preferably, the torque linkage and the pitch damper are disposed in front of the leg.

It is further advantageous for the hinged system associated with shortening the leg to include a lever hinged at the top of the shock-absorbing main strut, which lever comprises a long arm forming an alignment with an arm hinged on the plunging shock-absorbing rod, and a short arm hinged at the end of a threshold resilient link which is fixed at its other end to the aircraft structure.

Also preferably, the retraction stroke of the shock absorber and the two arms of the torque linkage are organized such that, in the undercarriage up position, the longitudinal beam is automatically in a substantially horizontal position. This then enables the recess for the undercarriage to be organized in a low-height space in the fuselage.

Also advantageously, the two arms of the foldable brace are organized such that, in the undercarriage down position and with the shock absorber extended, the direction of the alignment formed by the brace is substantially orthogonal to the axis of the leg. Such a layout not only enables the cutting forces applied to the sliding rod to be minimized, thereby making it possible to lighten the structure of the sliding rod significantly because the moments are taken up by the brace and the torque linkage, but also enables the pivoting motion of the leg to be minimized.

Finally, in a particular embodiment, the foldable brace is a collapsible brace provided with its own unlocking system, and the foldable brace is further organized such that the direction of the alignment that it defines in the undercarriage down position converges with the axis of the sliding rod as close as possible to the hinge axis of the longitudinal beam.

BRIEF DESCRIPTION OF THE DRAWING

Other characteristics and advantages of the invention will appear more clearly on reading the following description of a particular embodiment given with reference to the accompanying drawing, in which:

FIG. 1 is an elevation view showing an undercarriage of the invention, in the undercarriage down position (two ground-contact positions are shown, namely the landing contact position, represented by solid lines, and the taxiing contact position, represented by dot-dash lines), the undercarriage up position also being shown in dashed lines, with respect to the essential component parts of the undercarriage (the other component parts being merely represented by dot-dash lines); and FIGS. 2 and 3 are views seen respectively along arrow II and along arrow III of FIG. 1, the views facilitating understanding of the structure of the undercarriage leg and of the associated foldable brace.

MORE DETAILED DESCRIPTION

The figures show a raisable undercarriage 10 of the invention, the undercarriage comprising a hinged leg 100 and bracing means 140 associated with the hinged leg, the hinged leg being composed of a shock-absorbing main strut 101 having a hinge axis 102 about which it is hinged to the structure of an aircraft, and of a shock-absorbing rod 103 at the end of which a longitudinal beam 110 is hinged (the term "longitudinal" signifies that the long direction of the beam is parallel to the vertical longitudinal midplane of the aircraft), the longitudinal beam being equipped with a plurality of pairs of wheels 120.

In accordance with a characteristic of the invention, the undercarriage 10 is of the leg-shortening type, having a shock absorber composed mainly of a sliding rod 103 and of a plunging rod 104, and a hinged system 130 which connects the plunging rod to the shock-absorbing main strut 101, the system being controlled by a threshold resilient link 133 fixed at 126 to the aircraft structure, so as to pull the shock absorber up when the leg 100 is being raised, and so as to push the shock absorber down when said leg is being lowered.

In this example, the plunging rod 104 slides in a bearing 105 which is provided at the top of the main strut 101, (in a variant, the bearing could be provided on the plunging rod 104). The top end of the plunging rod is connected at 135 to a hinged system 130. In practice, the sliding rod has an intermediate partition delimiting a bottom hydraulic fluid chamber which communicates via a membrane with a top hydraulic fluid chamber inside the plunging rod. Furthermore, the plunging rod 104 has a bottom end provided with holes acting as a membrane, and a rod which is secured to the end of the sliding rod 103 passes through the center of said bottom end.

The hinged system 130 makes it possible to pull the shock absorber up without compressing it when the plunging rod 104 is pulled up (towards the hinge axis 102 of the leg) during raising of the undercarriage leg 100, or to lengthen said leg when the plunging rod 104 is pushed down by the hinged system (during lowering of said undercarriage leg). In this case, the hinged system 130 for shortening the leg includes a hinged lever 132 which is hinged at the top of the shock-absorbing main strut 101, and which comprises a long arm 132.1 which forms an alignment with an arm 131 that is hinged at 135 on the plunging shock-absorbing rod 104, and a short arm 132.2 hinged at the end of a threshold resilient link 133 which is fixed via its other end 126 to the aircraft structure.

If the undercarriage up position and the undercarriage down position shown in FIG. 1 are compared, it can be noted that, in the undercarriage up position, the hinged leg 100 is shortened, thereby making it easier to have a minimal-length recess L for receiving the raisable undercarriage 10 when it is in the up position. A drive actuator 125 hinged to the aircraft structure about an axis 126, and hinged to the main strut 101 of the hinged leg 100 via a projection 108, raises and lowers the hinged leg, and as a result automatically shortens the leg on raising it, and lengthens the leg on lowering it.

The longitudinal beam 110 is pivotally mounted to pivot about an axis 111 at the end of the sliding rod 103 via a projection 112 provided at the center of the beam. End projections 113 are provided at the ends of the longitudinal beam 110, the various projections being associated with the axles 121 (best seen in FIG. 2) of the pairs of wheels 120 of the undercarriage. In this example, the longitudinal beam 110 is equipped with three pairs of wheels, but naturally the invention also applies to a leg equipped with two pairs of wheels (like conventional rocking bogies), or with four pairs of wheels.

In accordance with another characteristic of the invention, the bracing means associated with the hinged leg 100 are in the form of a foldable brace 140 having a top arm 141 hinged at 142 on the aircraft structure, and a bottom arm 143 hinged at 144 (in this example via a projection 107) to the bottom end of the sliding rod 103, and the brace 140 is further organized such that, in the undercarriage down position, the lowered leg 100 slopes towards the front of the aircraft (the direction of the front of the aircraft is represented by arrow 200 in FIG. 1). As described below, this layout enables the longitudinal and lateral forces to be taken up well on contact with the ground.

In this example, the hinge axis 102 of the shock-absorbing main strut 101 is perpendicular to the longitudinal midplane of the aircraft, and the foldable brace 140 is disposed in front of the leg 100, so that the undercarriage is raised longitudinally and forwards. In this way, by a combination of the pivoting motion of the shock-absorbing main strut 101 and of the retraction of the leg shock-absorber, the set of wheels 120 is raised almost vertically into the associated recess L. Moreover, it is advantageous to provide forward raising insofar as the aerodynamic forces have a positive effect on the undercarriage leg when it is being lowered.

The undercarriage leg 100 further includes a torque linkage 115 having a top arm 117 hinged (via a projection 106) to the shock-absorbing main strut 101, and a bottom arm 116 hinged to the longitudinal beam 110, via a projection 114 thereon. This layout of the torque linkage differs substantially from conventional layouts in which the bottom arm of the torque linkage is hinged on the shock-absorbing rod.

Such a layout is particularly advantageous when the retraction stroke of the shock absorber and the geometrical shape of the torque linkage 115 are suitably chosen. By means of a suitable choice, it is possible to ensure that, in the undercarriage up position, the longitudinal beam 110 is automatically in a substantially horizontal position. In this way, without it being necessary to provide any additional linkage, raising the undercarriage leg 100 enables the rocking bogie to be brought back automatically into a horizontal position when said leg is fully raised. Such a layout naturally facilitates obtaining a recess L of minimal height.

It is also advantageous to provide a pitch damper 119 interposed between the torque linkage 115 and the shock-absorbing main strut 101. In this example, the body of the pitch damper 119 is hinged at the above-mentioned projection 108 on the main strut 101, and the rod of said damper is hinged on a projection 118 on the top arm 117 of the torque linkage 115. In this example, the torque linkage 115 and the pitch damper 119 are disposed in front of the leg 100, so as to ensure that the undercarriage behaves well when the rear pair of wheels make contact with the ground S in the sloping landing position. Such a layout is described in detail in Document FR-A-2,616,410 filed by the Applicant, and that document can be referred to in order to gain a better understanding of the resulting advantages.

Also with a view to optimizing the behavior of the undercarriage, it is advantageous to choose the dimensions of the two arms 141, 143 of the foldable brace 140 such that, when the undercarriage is in the down position and the shock absorber is extended, the direction of the alignment formed by the brace 140 is substantially orthogonal to the axis X of the undercarriage leg 100, as shown in FIG. 1, while ensuring that the direction of alignment converges with the axis X as close as possible to the hinge axis 111 of the longitudinal beam 110.

Such a layout firstly enables the cutting forces exerted on the sliding rod 103 by the set of wheels when the wheels bear against the ground to be eliminated, so that the structure of the sliding rod may be considerably lightened, insofar as the moments are taken up by the foldable brace 140. Moreover, this layout also minimizes the pivoting motion of the undercarriage leg when the sliding rod of the leg penetrates into the main strut.

In this example, the foldable brace 140 is a collapsible brace which is provided with its own unlocking system 145. Such an unlocking system is well known, and it is therefore not necessary to describe the principle of it in detail. Suffice to say that its essential components comprise, in succession, a link 146 hinged at the end of the top arm 141 of the brace, and a lever 147 which is hinged on the link and at the end of the other arm 143, on which lever the rod of an unlocking actuator 148 is hinged, the body of the unlocking actuator being hinged on a projection 149 on the bottom arm 143.

So as not to clutter the figure, the undercarriage up position shown in FIG. 1 only gives the essential members of the undercarriage leg, with dot-dash lines being used to represent the pitch damper 119, the arms 116 and 117 of the torque linkage, the arms 141 and 143 of the foldable brace, as well as the link 146, the lever 147, and the actuator 148 of the unlocking system associated with said foldable brace.

An undercarriage is thus provided having a structure enabling the recess for receiving the undercarriage when it is in the up position to be of optimum compactness, while also making it possible to take up the longitudinal and lateral forces produced when the undercarriage in the down position makes contact with the ground.

The invention is not limited to the above-described embodiment. On the contrary, the invention covers any variant which uses equivalent means to reproduce the essential characteristics described above.

We claim:

1. An aircraft raisable undercarriage comprising a hinged leg and bracing means associated with the hinged leg, the hinged leg being composed of a shock-absorbing main strut having a hinge about which it is hinged to the structure of an aircraft, said hinge defining a hinge axis which is perpendicular to the longitudinal midplane of the aircraft, and of a shock-absorbing rod at the end of which a longitudinal beam is hinged that is equipped with a plurality of pairs of wheels, wherein:

the undercarriage is of the leg-shortening type, having a shock absorber composed mainly of a sliding rod and a plunging rod, and also of a hinged system connecting the plunging rod to the shock-absorbing main strut, the hinged system being controlled by a link fixed to the aircraft structure so as to pull the shock absorber up when the leg is being raised, and so as to push the shock absorber down when the leg is being lowered; and the bracing means are organized in the form of a foldable brace which is disposed in front of the leg so that the undercarriage is raised longitudinally and forwards, said brace having a top arm hinged to the aircraft structure and a bottom arm hinged to the bottom end of the sliding rod, and said brace further being organized so that, in the undercarriage down position and with the shock absorber extended, the lowered leg slopes towards the front of the aircraft, and the direction of the alignment formed by the brace is substantially orthogonal to the axis of the leg.

2. An undercarriage according to claim 1, wherein the foldable brace is a collapsible brace provided with its own unlocking system, and the foldable brace is further organized such that the direction of the alignment that it defines in the undercarriage down position converges with the axis of the sliding rod as close as possible to the hinge axis of the longitudinal beam.

3. An undercarriage according to claim 1, wherein the leg further includes a torque linkage having a top arm hinged to the shock-absorbing main strut, and a bottom arm hinged to the longitudinal beam which is hinged at the end of the sliding rod.

4. An undercarriage according to claim 3, wherein a pitch damper is interposed between the torque linkage and the shock-absorbing main strut.

5. An undercarriage according to claim 4, wherein the pitch damper is hinged on a projection on the top arm of the torque linkage.

6. An undercarriage according to claim 1, wherein the torque linkage and the pitch damper are disposed in front of the leg.

7. An undercarriage according to claim 1, wherein the hinged system associated with shortening the leg includes a lever hinged at the top of the shock-absorbing main strut, which lever comprises a long arm forming an alignment with an arm hinged on the plunging shock-absorbing rod, and a short arm hinged at the end of a threshold resilient link which is fixed at its other end to the aircraft structure.

8. An undercarriage according to claim 3, wherein the retraction stroke of the shock absorber and the two arms of the torque linkage are organized such that, in the undercarriage up position, the longitudinal beam is automatically in a substantially horizontal position.

* * * * *